United States Patent [19]
Wallace et al.

[11] Patent Number: 5,650,448
[45] Date of Patent: Jul. 22, 1997

[54] FLAME RETARDANT FLEXIBLE FOAM

[75] Inventors: William R. Wallace, Manchester; Ronald J. Baumforth, Bollington, both of Great Britain

[73] Assignee: Kay-Metzeler Limited, Manchester, Great Britain

[21] Appl. No.: 627,002

[22] Filed: Apr. 3, 1996

[30] Foreign Application Priority Data

Apr. 3, 1995 [GB] United Kingdom .................. 9506836

[51] Int. Cl.$^6$ ........................................................ C08J 9/10
[52] U.S. Cl. ..................... 521/82; 521/79; 521/81; 521/94; 521/143; 521/149; 521/907; 521/54; 523/218; 523/219; 523/179
[58] Field of Search ..................... 521/94, 79, 81, 521/82, 149, 143, 907, 54; 523/218, 219, 179

[56] References Cited

U.S. PATENT DOCUMENTS

| | | |
|---|---|---|
| 3,574,644 | 4/1971 | Olstowski et al. . |
| 4,698,369 | 10/1987 | Bell . |
| 4,722,945 | 2/1988 | Wood et al. ............... 521/65 |
| 5,169,876 | 12/1992 | Heitmann et al. . |
| 5,192,811 | 3/1993 | Heitmann et al. . |
| 5,397,643 | 3/1995 | von Bonin et al. ....... 521/55 |

FOREIGN PATENT DOCUMENTS 2168706  6/1986  United Kingdom .

OTHER PUBLICATIONS

WPI Abstract Accession No.: 95–281016/37 & JP070179641 A, 18 Jul. 1995.
WPI Abstract Accession No.:95–203956/27 & JP070118435 A, 09 May 1995.
WPI Abstract Accession No.:93–039401/05 & JP040363341 A, 16 Dec. 1992.

*Primary Examiner*—Morton Foelak
*Attorney, Agent, or Firm*—Cushman Darby & Cushman Intellectual Property Group of Pillsbury Madison & Sutro, LLP

[57] ABSTRACT

A flexible closed cell polymeric foam contains expandable graphite as fire retardant. The foam is prepared by mixing a polymer, a curing agent, at least one blowing agent and an expandable graphite at a temperature of at least 100° C. but below a temperature causing activation of the blowing agent to foam a foamable mixture and thereafter heating the foamable mixture to activate the blowing agent and cause foaming. The method of preparation may additionally include a curing step in which the foamable mixture is heated under pressure to activate simultaneously each of a curing agent, which is preferably a free radical curing agent, and a foaming agent. The foams are capable of meeting the US Federal Aviation Authority Standards, especially the oil burner test of FAR 25 Appendix F, part II.

14 Claims, No Drawings

FLAME RETARDANT FLEXIBLE FOAM

FIELD OF THE INVENTION

This invention relates to fire retardant polymeric foam materials.

BACKGROUND OF THE INVENTION

It is known that, especially nowadays, it is necessary for foams, especially for use in the aircraft industry, for example in seating, to pass highly stringent fire performance tests such as those of the U.S. Federal Aviation Authority, namely FAR Part 25, Appendix F. In particular, the seat cushion and seat back upholstery assemblies all need to meet the flammability requirements of the oil burner test FAR 25 Appendix F, Part II. In addition, each individual component of the seat cushion and back assemblies, e.g. foams, fabrics, interliners and fastenings, must meet the flammability requirements of FAR 25 Appendix F, Part I, a vertical strip ignition test, also required by the UK Civil Aviation Authority, namely CAA8 Issue 2.

Until recently, core foams and dress cover materials were available which would individually meet the small scale ignition requirements of FAR 25 Appendix F, Part I, but in combination could not meet the more severe oil burner test FAR 25 Appendix F, Part II, without the use of a fire barrier material which completely encapsulates the foam core. This could be adhered to the foam or used as a loose liner inside the dress cover, or be integrated into the dress cover.

The normal practice throughout the world is for an inflatable life jacket to be stored underneath the passenger seat, for use in emergency should the aircraft be forced to land on water. There are, however, exceptions to this—notably in the USA and Canada, where the regulations allow for the use of an inflatable life jacket and/or the need for the seat cushion to be sufficiently buoyant to support the passenger in water. Since aircraft seat cushions are predominantly made from flexible polyurethane foams which are open celled, and hence absorb water, this is currently achieved by incorporating a closed cell foam, e.g. polyethylene, into the seat construction. The seat cushion is held in place by the use of velcro type fastenings and this can be readily removed from the seat frame when required, as a buoyancy aid.

However, to date, although the component providing the buoyancy may meet the requirements of the abovementioned FAR 25 Appendix F, Part I (vertical strip ignition) test, it does not meet the abovementioned FAR 25 Appendix F, Part II (oil burner) test for resistance to flammability when in a seat construction, unless it is protected by a fire blocking (usually fabric) material.

Relatively recently, flexible polyurethane foams have been introduced which have been provided with a fire resistance sufficiently high to meet the above oil burner test. This has been achieved by post-treatment of the foam or incorporation into it of a solid flame retardant such as expandable graphite, so that the need for a fire barrier layer was negated. However, for cushions containing a buoyancy foam it was still necessary to block separately, with a fire barrier layer, the buoyancy foam; otherwise the above oil burner test could still not be satisfied.

Expandable graphite referred to above, is a fire retardant known to be capable of imparting high fire retardancy to various materials when incorporated into them. It is a form of graphite containing at least one exfoliating agent such that at high temperatures, considerable expansion will occur.

U.S. Pat. No. 3,574,644 discloses the incorporation into many materials of expandable graphite for conferring upon them flame retardancy. Examples are greases, petroleum oils, asphalts, rubbers, wood, film forming agents such as latexes, paints etc, and synthetic and natural polymeric material such as cellulosics, polystyrene, polyethylene, polyurethane etc. The only foam material mentioned is a rigid polyurethane foam. However, such foams are not flexible and the closed cells of such a foam are easily fractured upon compression, thus rendering the material non-buoyant. For this reason, such foams are of no practical value for providing buoyancy in seating applications, where such compressive forces will of course be experienced.

GB-A-2168706 discloses the incorporation into flexible polyurethane foams of expandable graphite, while U.S. Pat. No. 5,169,876 reports an improvement in such a foam by ensuring that the flakes of the expandable graphite have a size in the order of magnitude of resultant foam cell walls. However, such flexible foams are of an open cell structure and cannot serve as a buoyancy aid.

On the other hand, in the packaging industry and as buoyancy aids, polyolefinic foams have found use. However, in order not to disturb the closed cell nature of the foams, such foams have been rendered fire retardant by the use of compounds providing halogen and/or phosphorous, or by modifying their structure so as to provide the presence of such compounds or by using small particle size compounds such as antimony oxide, borax or melamine containing compounds.

SUMMARY OF THE INVENTION

We have now found surprisingly that a foam having sufficiently excellent fire retardant properties to be able to pass the abovementioned FAR Part 25 Appendix F series of tests, especially the FAR 25 Appendix F, Part II oil burner test can be obtained by the incorporation of an expandable graphite into a polymeric closed cell foam structure.

Thus, according to one aspect, the present invention provides a flexible closed cell polymeric foam containing expandable graphite.

According to ASTM D1056-1985, a flexible cellular structure is defined as a cellular structure which will not rupture within 60 secs. when a specimen 200×25×25 mm is bent around a 25 mm mandrel at a uniform rate of one lap in 5 secs. in the form of a helix at a temperature between 18° and 29° C.

According to the above ASTM, an "expanded rubber" is defined as a cellular rubber having closed cells made from a solid rubber compound. In accordance with the invention, not only expanded rubbers but other expanded cellular polymers having closed cells may be employed.

Thus, the foam structure may be of a polymer derived from at least one monomer selected from mono-and polyalkylenically unsaturated monomers such as α-olefins, for example, ethylene, propylene and vinyl acetate and dienes, for example, butadiene, neoprene, hexa-1,4-diene and 5-ethylidene-2-norbonene, so that the polymer may be an essentially saturated polyolefin such as an α-olefin polymer or copolymer, an unsaturated polymer such as a rubber or a copolymer of at least one α-olefin and a diene. Typical examples are low density polyethylene, an ethylene-vinyl acetate copolymers, ethylene-propylene rubbers (for example, those which bear the ASTM designation EPM rubbers) and so-called ethylene-propylene terpolymers (which bear the ASTM designation EPDM rubbers).

Preferably, the polymer of the foam structure is derived from at least one ethylenically unsaturated α-olefin such as ethylene and is more preferably derived from a copolymer of ethylene and at least one other ethylenically unsaturated α-olefin. Particular examples are a low density polyethylene and copolymers of ethylene with vinyl acetate (EVA). With increasing preference, such an EVA contains from 5 to 70, 6 to 60, 10 to 50, 12 to 40, 15 to 30, 18 to 28 and 20 to 25% by weight of vinyl acetate.

In accordance with the invention, expandable graphite is incorporated into such expanded polymers. This expandable graphite can be prepared by known methods such as those disclosed in U.S. Pat. No. 3,574,644.

The expandable graphite may be present in the foam in an amount of from 5 to 50% by weight, but is preferably present in an amount not exceeding 30% by weight of the final foam. More preferably, the graphite is present in an amount of from 10 to 25%, especially 15 to 20% of the total foam.

In addition to the expanded graphite, the foam may contain at least one additional fire retardant ingredient, for example, a halogen and/or phosphorous containing compound, especially a brominated polymeric compound, or a metal oxide such as antimony oxide or hydrated alumina or a borax or melamine containing compound. A preferred additional fire retardant is decabromodiphenyl oxide, a high purity grade of which is commercially available from Albermarle SA as Sayrex 102E. This contains a high level of aromatic bromine.

According to another aspect, the invention provides a method of preparing a flexible closed cell polymeric foam containing expandable graphite, which method comprises a mixing step in which each of a polymer, a curing agent, at least one blowing agent (or a latent blowing agent, i.e. a compound capable of decomposition under heating to release a blowing agent) and an expandable graphite are mixed at a temperature sufficient to allow formation of a uniform foamable mixture, typically at least 100° C., but below a temperature causing activation of the blowing agent, and thereafter a foaming step in which the foamable mixture is heated to a temperature sufficient to activate the blowing agent, typically at least 110° C., and thereby cause foaming. Curing of the polymer may take place during at least one of the mixing and foaming steps or as a separate step and is preferably carried out by heating the foamable mixture to a curing temperature, typically at least 140° C., under pressure, typically at least 1,000 psi.

Preferably, as later described, the blowing agent is an azodicarbonamide and the uniform mixture additionally comprises a secondary blowing agent, which may be either exothermic or endothermic as later described and a compound capable of serving as a heat sink, for example, magnesium carbonate.

Thus, the closed cell foam may be prepared by mixing together each of the polymer, a curing agent, a co-agent (optional, but sometimes preferable), the expandable graphite flame retardant and at least one blowing agent, preferably at a temperature of from about 105°–125° C., more preferably about 110°–120° C. to provide a homogeneous mixture, and thereafter activating simultaneously each of the curing and blowing agents by heating preferably to a temperature of from about 115° to 250° C., more preferably about 120° to 220° C. under pressure. More preferably, the foamed mixture is heated to a temperature of at least 140° C., more preferably at least 150° C., and preferably up to a maximum temperature of 200° C., more preferably 180° C. (a most preferred temperature range being 160°–170° C.), under pressure, preferably 1,000–4,000 psi more preferably 1,500–3,500 psi, especially 1,800–3,000 psi. During this heating, not only is the curing agent activated but the blowing agent is activated to initiate foaming.

The curing and foaming steps may be carried out while compression moulding to provide a block capable of expansion.

In such a curing operation, the foamable mixture is subjected in the mould to the abovementioned heat and pressure conditions and thereafter is preferably cooled, more preferably to a temperature of 60° C. or less and then released from the mould.

Thus, although the pressure on the high temperature cured foam may be released while the foam is hot, it is especially desirable to cool before release of the pressure to allow a subsequent controlled expansion of the foam, thereby attaining sufficient retention of the closed cell structure.

Such subsequent controlled expansion of the foam may then be achieved by heating the foam, for example, in an oven, preferably to a temperature of from about 80° to 200° C., more preferably about 90° to 180° C., still more preferably about 100° to 150° C., especially 110° to 140° C. inclusive. The thermal energy thus imparted expands the gases in the closed cells to cause expansion of the foam, thereby providing the desired expanded foam material.

A foam material of the desired shape may be formed by moulding to form a block of a shape such that on heating the block it will expand to provide the foam material of the desired shape. Alternatively the foamed material may later be cut to the desired shape, either before or after expansion.

Typically, all ingredients are mixed together in an internal mixer such as a Banbury mixer to provide a composition at about 115° C. The composition may then be extruded into a form suitable for compression moulding. Compression moulding is then effected at about 160° C.–165° C., when curing and foaming take place. The cured moulding is then allowed to cool while still in the mould. After moulding, for example into blocks, the cured moulding is released from the mould and expanded by heating, preferably in an oven, to a temperature of from 110°–140° C. and allowed to cool to provide a closed cell flexible foam.

In the mixture for foaming, expandable graphite is preferably present in an amount of from 5 to 30%, more preferably 10 to 25%, especially 12 to 22%, more especially 14 to 20%, by weight of the total weight of the composition. However, it is especially preferred that the amount of expandable graphite be within the range 22–30% by weight of polymer.

Preferably, curing is carried out by free radical polymerization, using a free radical curing agent such as a peroxide, for example, bis (tert. butyl peroxy isopropyl) benzene, commercially available from Akzo Chemie as PERKADOX 14-40, preferably in the presence of a co-agent. The co-agent increases the efficiency of the curing agent by grafting itself onto the polymer chain, thereby providing additional curing sites. The co-agent is preferably a compound having at least two free ethylenically unsaturated end groups, such as a polyacrylate ester of a polyol. Such co-agents are commercially available from Ancomer as ATM-14 (a commercially available source of butylene glycol dimethacrylate) and ATM-16, and from Bayer as TAC.

The blowing agent may be, for example, an azodicarbonamide derivative. Blowing agents of this type are commercially available, for example, as Celogen AZ (Uniroyal) and Fascom AZ4ED (West & Senior).

It is especially preferred to include, in addition to the primary blowing agent, a blowing assisting agent (which may also be referred to as a "secondary blowing agent"), which may be either of two types fulfilling alternative respective roles.

Thus, one alternative type secondary blowing agent is exothermic and decomposes at a temperature lower than the decomposition temperature of the primary blowing agent. The exotherm created assists in initiating decomposition of the primary blowing agent. Examples of such secondary blowing agents are hydrazides such as 4,4'-oxybis (benzenesulphonyl hydrazide), commercially available from Uniroyal as Celogen OT.

The other alternative type of blowing agent is endothermic and serves additionally as a heat sink. An example of such a secondary blowing agent is a formulated zinc product commercially available from Bayer AG as Genitron AFA.

In addition, or as an alternative, to such endothermic or exothermic blowing agents, other endothermic materials, for example, magnesium carbonate, may also be present as a heat sink.

The amount of primary blowing agent is preferably within an amount of from 5 to 20% by weight of polymer and the amount of blowing assistant is preferably about 1 to 3% by weight of polymer.

In addition to the above components, the mixture preferably additionally includes a so-called "kicker". This may, for example, be zinc stearate, which also acts as a lubricant. Alternatively, a lubricant, additional or alternative to the kicker, may be added. The lubricant is preferably present in an amount of from 1 to 3% by weight of polymer.

Compositions are available commercially which include each of a blowing agent, a secondary blowing agent, a heat sink and a kicker or lubricant. For example, Genitron 45/1 commercially available from Bayer AG, provides a particularly stable and robust foam. This composition has the following constitution:

1. A standard azodicarbonamide having a particle size of 4 micron (highly exothermic primary blowing agent) 65%
2. Genitron AFA—a formulated zinc compound (endothermic secondary blowing agent) 19%
3. Magnesium carbonate light (heat sink) 8%
4. Zinc stearate (kicker and lubricant) 8%.

The magnesium carbonate, in addition to serving as a heat sink (enhancing the performance of the endothermic secondary blowing agent in reducing the heat resulting from decomposition of the primary blowing agent) additionally improves the cell structure by making the cells finer and more homogenous throughout the polymer matrix, so rendering the foam even more stable, i.e. more capable of withstanding expansion without collapse.

The above foaming mixture is curable to provide a flexible fire retardant, closed cell, foam having excellent fire retardancy and buoyancy.

Although primarily suitable for buoyant seats for aircraft, the foams have considerable additional application such as seats in boats, especially lifeboats, and oil rigs, wall insulation and packing, especially aircraft internal cabin wall packing, ground transportation seating, for example in trains and buses, and in the packaging industry.

The density of the foam may be in the range 20–120 kg/m³, preferably 30–90 kg/m³, more preferably 40–60 kg/m inclusive, depending upon the intended application.

Advantages of the closed cell flexible foam in accordance with the invention are as follows:

(i) they are excellent in both fire retardancy and buoyancy, with a high degree of ignition resistance, low flammability and low smoke and toxic gas emissions;

(ii) they can be used in combination with graphite containing polyurethane flexible open celled foam without the need for any fire blocking layer such as a barrier fabric;

(iii) as a result, complexities of cushion construction are reduced; thus, in a fabricated cushion, there is no longer a need to adhere a fire barrier fabric to the floatation foam, while in a moulded cushion, the foam can be moulded in situ into the cushion;

(iv) the foam may be more flexible and softer than standard polyethylene floatation foams currently in use; this makes it more comfortable in service. In particular, where the cushion contains an overlaying polyurethane foam, this does not bottom out onto a hard foam layer. This therefore allows a greater degree of flexibility in cushion design, when for example, it is necessary to incorporate the floatation foam as wedges at the sides of the seating area. The foam in accordance with the invention does not detract from the seating comfort if situated in the central area of the cushion.

For added "flotation" to meet FAA requirements, the volume percentage of buoyancy foam in an aircraft seat is preferably between 5–40%, more preferably 10–30%, especially 15–25%.

It is found that a foam in accordance with the invention may meet the smoke and toxic gas emission requirements for use in commercial aircraft interiors, for example, the Airbus Industries specification ABD 0031, issue A.

Moreover, we find that seat cushion and seat back upholstery assemblies containing foams embodying the invention as flotation foam components meet the flammability requirements of FAR Part 25 Appendix F, in particular, the oil burner test, FAR 25 Appendix F, Part II. In addition, each individual component of the seat cushion and back assemblies, e.g. foams, fabrics, interliners and fastenings, meets the flammability requirements of FAR 25 Appendix F, Part I, a vertical strip ignition test. Yet another advantage of such foams embodying the invention is that they are non-dripping on burning.

DESCRIPTION OF PREFERRED EMBODIMENTS

Foams embodying the invention will now be described in more detail with reference to the following Examples, in which all parts are by weight.

EXAMPLES 1–3

Low density, flexible polyolefinic foams were made from the formulation shown in Table A, using the following procedure.

All ingredients were mixed in a Banbury mixer at 105°–115° C. and the resultant composition was extruded into a form suitable for compression moulding. The composition was then compression moulded into a block at 160° C., when curing took place. The cured block was expanded by heating in an oven at 110°–140° C. and allowed to cool.

TABLE A

| INGREDIENTS | Control A | Control B | Example 1 | Example 2 | Example 3 |
|---|---|---|---|---|---|
| Polymer (a1) | 100.0 | 100.0 | 100.0 | 100.0 | 100.0 |
| Primary Blowing Agent (b1) | 10.0 | 14.0 | 14.0 | 14.0 | 14.0 |
| Secondary | 2.0 | 2.0 | 2.0 | 2.0 | 2.0 |

TABLE A-continued

| INGREDIENTS | Control A | Control B | Example 1 | Example 2 | Example 3 |
|---|---|---|---|---|---|
| Blowing Agent (b2) | | | | | |
| Lubricant (c) | 2.0 | 2.0 | 2.0 | 2.0 | 2.0 |
| Expandable Graphite | — | — | 22.50 | 28.0 | 18.0 |
| Curing Agent (d) | 1.0 | 1.0 | 1.5 | 1.5 | 1.5 |
| Co-Agent (e) | — | — | 0.5 | 0.5 | 0.5 |
| Flame Retardant (f) | — | 20 | — | — | |
| Flame Retardant (g) | | | | | 5.0 |

Notes to Table A.
(a1) An EVA available from Exxon Chemicals as UL00218.
(b1) A blowing agent which is an azodicarbonamide available from Bayer Chemicals as Porofor KA9149, and available from West & Senior as Fascom AZ4ED.
(b2) A secondary blowing agent which is 4,4'-oxybis (benzenesulphonyl hydrazide) available commercially from Uniroyal as Celogen TO.
(c) Zinc Stearate available from Durham Chemicals.
(d) Bis(tert.butyl peroxy isopropyl) benzene, a peroxide curing agent commercially available from Akzo Chemie as Perkadox 14-40.
(e) ATM-16* commercially available from Ancomer (*results similar to the above were also obtained using ATM-14, also commercially available from Ancomer).
(f) Cereclor S52, a chlorinated paraffin commercially available from ICI.
(g) A phosphorus/chlorine flame retardant commercially available from Albright & Wilson as Amgard V6.

Samples of each of the above foams were subjected to the burning tests described in FAR 25 Appendix F, Part I and results are shown in Table 1.

TABLE 1

FAR 25 Appendix F, Part I BURN TEST RESULTS

| Sample | Burn Length mm | Afterflame Time s | Burning Drips time s | Comments |
|---|---|---|---|---|
| Specification | 200 max. | 15 max. | 5 max. | |
| 1. Control A | 270 | 70 | 5 | Continued to burn, |
| | 270 | 60 | 14 | drips burned on |
| Mean | 270 | 65 | 9.5 | base of cabinet. FAIL |
| 2. Control B | 305 | 192 | 30 | Flared up, totally |
| | 305 | 123 | 100 | consumed, drips |
| | 305 | 157 | 65 | burned on base of cabinet. FAIL |
| 3. Example 1 | 75 | 2 | 0 | No dripping, |
| | 65 | 2 | 0 | burn length and |
| | 60 | 8 | 0 | afterburn time |
| | 60 | 3 | 0 | well within |
| | 60 | 4 | 0 | specification |
| | 65.5 | 3.8 | 0 | PASS |
| 4. Example 2 | 40 | 2 | 0 | No dripping, |
| | 45 | 2 | 0 | burn length and |
| | 47 | 6 | 0 | afterburn time |
| | 40 | 4 | 0 | well within |
| | 40 | 4 | 0 | specification. |
| | 41.8 | 3.6 | 0 | PASS |
| 5. Example 3 | 105 | 14 | 0 | No drips, |
| | 90 | 13 | 0 | burn length in |
| | 85 | 16 | 0 | specification. |
| | 90 | 16 | 0 | Afterflame time |
| | 87 | 17 | 0 | out of spec. |
| | 91.4 | 15.2 | 0 | FAIL |

EXAMPLES 4–6

Further flexible polyolefinic foams were made from the following formulations shown in Table B, using the method described with reference to Examples 1–3.

TABLE B

| INGREDIENTS | Example 4 | Example 5 | Example 6 |
|---|---|---|---|
| Polymer (a1) | 100.0 | | 100.0 |
| Polymer (a2) | | 100.0 | |
| Blowing Agent (b1) | 14.0 | | 14.0 |
| Blowing Agent (b2) | — | 12.0 | |
| Secondary Blowing Agent (b3) | | 2.0 | |
| Lubricant (c) | 2.0 | 2.0 | 2.0 |
| Expandable Graphite | 22.0 | 22.0 | 28.0 |
| Curing Agent (d) | 1.5 | 1.5 | |
| Co-agent (e) | 0.5 | 0.5 | |
| Flame Retardant (f1) | | | 6.0 |
| Flame Retardant (f2) | | | 3.0 |

Notes to Table B.
(a1) An EVA commercially available from Exxon Chemicals as UL00328
(a2) A high vinyl acetate content polymer commercially available from Bayer as Levapren 500.
(b1) A blowing agent which is a modified azodicarbonamide commercially available from Bayer as Genitron 45/1
(b2) A blowing agent which is an azodicarbonamide commercially available from Bayer as Porofor KA 9149, and also available from West & Senior as Fascom AZ4ED.
(b3) A secondary blowing agent which is a formulates zinc compound commercially available from Bayer as Genitron AFA.
(c) Zinc stearate available commercially from Durham Chemicals.
(d) Bis(tert. butyl peroxy isopropyl) a peroxide curing agent commercially available from Akzo Chemie as Perkadoz 14.40
(e) ATM 16* commercially available from Ancomer (*results similar to the above were also obtained using ATM-14, also commercially available from Ancomer).
(f1) A brominated Flame-retardant compound commercially available from Albermerle S.A. as Saytex 102.
(f2) Antimony oxide commercially available from Cooksons.

TABLE 2

FAR 25 Appendix F, Part I BURN TEST RESULTS

| Sample | Burn Length mm | Afterflame Time s | Burning Drips time s | Comments |
|---|---|---|---|---|
| Specification | 200 max. | 15 max. | 5 max. | |
| Example 4 | 70 | 12 | 0 | No drips, |
| | 70 | 8 | 0 | burn length |
| | 78 | 14 | 0 | and afterflame |
| | 80 | 14 | 0 | time within |
| | 87 | 12 | 0 | specification |
| | 77 | 12 | 0 | PASS |
| Example 5 | 50 | 10 | 0 | Burn length and |
| | 45 | 7 | 0 | afterflame time |
| | 47 | 11 | 0 | in specification |
| | 48 | 8 | 0 | No drips. |
| | 53 | 8 | 0 | |
| | 48.6 | 8.8 | 0 | PASS |
| Example 6 | 45 | 4 | 0 | No drips, |
| | 40 | 5 | 0 | afterflame time |
| | 38 | 5 | 0 | and burn length |
| | 40 | 7 | 0 | in specification. |
| | 40 | 4 | 0 | |
| | 40.6 | 5 | 0 | PASS |

EXAMPLES 7–9

Low density polyolefinic foams were made from the formulation shown in Table C, using the same procedure as that described with reference to Examples 1–3, but mixing in the Banbury mixer at 110°–120° C.

TABLE C

| INGREDIENTS | Example 7 | Example 8 | Example 9 |
|---|---|---|---|
| Polyolefinic Polymer (a) | 100.0 | 100.0 | 100.0 |
| Blowing Agent (b1) | 14.0 | | 14.0 |
| Secondary Blowing Agent (b2) | | 12.0 | |
| Secondary Blowing Agent (b3) | | 2.0 | |
| Kicker/Lubricant (c) | 2.0 | 2.0 | 2.0 |
| Expandable Graphite | 22.0 | 28.0 | 18.0 |
| Curing Agent (d) | 2.5 | 2.5 | 2.5 |
| Co-agent (e) | 0.5 | 0.5 | 0.5 |
| Flame Retardant (f) | | | 5.0 |
| Flame Retardant (g) | | | 3.0 |

(a) A low density polyethylene commercially available from Exxon Chemicals as LD 250.
(b1) Genitron 45/1 (see Foam Type 2).
(b2) Fascom AZ4ED (see Foam Type 2).
(b3) Genitron AFA (see Foam Type 2).
(c) Zinc stearate (see Foam Type 2).
(d) Perkadox 14.40 (see Foam Type 2).
(e) A co-agent commercially available from Bayer as TAC
(f) A Brominated FR commercially available from Albemarle S.A. as Saytex 102E.
(g) Antimony oxide commercially available from Cooksons.

TABLE 3

FAR 25 Appendix F, Part I BURN TEST RESULTS

| Sample | Burn Length mm | Afterflame Time s | Burning Drips time s | Comments |
|---|---|---|---|---|
| Specification | 200 max. | 15 max. | 5 max. | |
| 1. Example 7 | 85 | 7 | 0 | No dripping, |
|  | 75 | 9 | 0 | burn length and |
|  | 75 | 9 | 0 | afterflame time |
|  | 80 | 8 | 0 | within |
|  | 85 | 8 | 0 | specification. |
|  | 80 | 8.2 | 0 | PASS |
| 2. Example 8 | 40 | 3 | 0 | No drips, |
|  | 50 | 2 | 0 | burn length |
|  | 45 | 2 | 0 | and afterflame |
|  | 45 | 3 | 0 | time within |
|  | 48 | 6 | 0 | specification. |
|  | 47.6 | 3.2 | 0 | PASS |
| 3. Example 9 | 120 | 13 | 0 | No drips, |
|  | 112 | 13 | 0 | burn length |
|  | 95 | 15 | 0 | and afterflame |
|  | 108 | 14 | 0 | time within |
|  | 105 | 12 | 0 | specification. |
|  | 108 | 13.4 | 0 | PASS |

EXAMPLE 10

Low density, permanently closed cell foams were prepared as for Examples 4–6 from the formulation shown in Table D below and using the method described with reference to Foam Type 1.

TABLE D

| INGREDIENTS | Example 10 |
|---|---|
| Polyolefinic polymer (a) | 100.00 |
| Blowing agent (b) | 15.00 |

TABLE D-continued

| INGREDIENTS | Example 10 |
|---|---|
| Expandable graphite | 26.00 |
| Zinc stearate (c) | 2.00 |
| Curing agent (d) | 1.50 |
| Flame retardant (f1) | 5.00 |
| Flame retardant (f2) | 3.00 |

(a) Ethylene vinyl acetate commercially available from Exxon or Escorene 00328.
(b) Genitron 45/1 (see Foam Type 2)
(c) Zinc stearate (see Foam Type 2)
(d) Perkadox 14.40 (see Foam Type 2)
(f1) Bromide FR, commercially available from Albemarle SA
(f2) Antimony oxide commercially available from Cooksons.

TABLE 4

FAR Appendix F, Part I Burn Test Results

| Samples of Example 10 | Burn Length mm | Afterflame time s | Comments |
|---|---|---|---|
| Specification Sample | 200 max. | 15 max. | |
| 1 | 85 | 2 | |
| 2 | 85 | 2 | |
| 3 | 87.5 | 3 | |
| 4 | 80 | 2 | |
| 5 | 77.5 | 2 | |
|  | 83 | 2.2 | PASS |

EXAMPLE 11

In order to illustrate the excellent flammability of an expanded graphite containing foam embodying the invention, tests were carried out, in accordance with FAR Part 25, Appendix F, Part II, using kerosene, on a mock-up seat configuration fitted with foamed cushions and seat backs in which the seat cushions contained the following foams (a) the poly(ethylene-vinyl acetate) (EVA)/expanded graphite foam of Example 10 (25%) bonded to a 55 kg/m$^3$ density aircraft grade expandable graphite-containing polyurethane (PU) foam (MP55) (75%);

(b) ETHAFOAM 225EFR, a standard, polyethylene (PE) buoyancy ("flotation") foam, commercially available from Dow, (25%) bonded to MP55 PU foam (75%);

(c) MP55 PU foam (100%).

The seat backs in all cases consisted of 100% MP55 PU foam.

When conducting the tests on the seats, the buoyancy foam was positioned facing downwards.

Tests were conducted both with and without a typical 90:10 wool:nylon aircraft grade dress cover fabric (NB Tests for certification are conducted with a specified cover, so that those for a seat without a cover are merely indicative tests which serve to illustrate the difference in flammability between the foam embodying the invention and the standard PE foam without the influence of the cover).

TABLE 5

Test Results to FAR Part 25 Appendix F, Part II

| Cushion Construction | | | | | |
| --- | --- | --- | --- | --- | --- |
| % MP55 PU Foam | 100 | 75 | 75 | 75 | 75 |
| % EVA/Graphite Buoyancy Foam | — | 25 | 25 | — | — |
| % STD PE Buoyancy Foam | — | — | — | 25 | 25 |
| Dress Cover 90:10 Wool/Nylon | No | No | Yes | No | Yes |
| Initial weight g | 2179 | 1987 | 2690 | 2085 | 2808 |
| Final weight g | 2051 | 1868 | 2507 | 1809 | 2491 |
| Weight loss g | 128 | 119 | 183 | 276 | 317 |
| Weight loss % | 5.9 | 6.0 | 6.8 | 13.2 | 11.3 |
| Afterflame s | 40 | 65 | 155 | 300+ | 300+ |
| Burn Across | | | | | |
| Back Front in | 9 | 11.5 | 7 | 10 | 7 |
| Back Back in | 0 | 0 | 0 | 0 | 0 |
| Cushion Top in | 9 | 10.5 | 6 | 8.25 | 6 |
| Cushion Bottom in | 10 | 11 | 10 | 17.5 | 11.5 |
| Extent of Dripping | None | None | None | Much | Much |
| Result | PASS | PASS | PASS | FAIL | FAIL |

It can be seen that both samples containing the standard PE buoyancy foam failed because the weight loss was greater than 10% and the sample of the standard PE buoyancy foam unprotected by a dress cover additionally failed because the burn across length for the cushion bottom was greater than the maximum 17 in. allowed by the test. In addition, they did not self-extinguish and continued to drip molten material which ignited below the test rig.

In contrast, the samples containing a buoyancy foam embodying the invention (with and without the dress cover) showed a weight loss of less than 7%, a significant and important reduction as compared with the standard PE buoyancy foam and well within the requirements of the test. Moreover they were self-extinguishing and did not drip molten material; although such non-dripping is not a requirement of the above test, it is clearly an additional important advantage associated with the buoyancy foam embodying the invention.

The above results illustrate well the superiority of an EVA/expanded graphite foam embodying the invention as compared with a current commercially available foam when incorporated in a seat configuration for testing and provide a good indication as to how such a foam will excel in practical application, especially in an aircraft seat cushion.

We claim:

1. A method of preparing a flexible closed cell polymeric foam containing expandable graphite, which method comprises a mixing step in which each of a polymer, a curing agent, at least one blowing agent and an expandable graphite are mixed at a temperature of at least 100° C. but below a temperature causing activation of the blowing agent to form a foamable mixture, said polymer comprising units derived from at least one monomer selected from mono- and polyalkylenically unsaturated monomers, a foaming step in which the foamable mixture is heated to a temperature sufficient to activate the blowing agent, and curing of the polymer by the curing agent taking place during at least one of the mixing step, the foaming step, and a separate curing step performed between the mixing and foaming steps.

2. A method according to claim 1, wherein the mixing step is carried out at a temperature of from 105° to 125° C.

3. A method according to claim 1, wherein the foaming step is carried out at a temperature of from 115° to 250° C. under pressure.

4. A method according to claim 1, wherein the foamable mixture is uncured and the method includes simultaneously curing and foaming the foamable mixture by heating under pressure at a temperature of at least 140° C. under a pressure of at least 1000 psi.

5. A method according to claim 4, which includes the subsequent steps of cooling the cured, foamed mixture while maintaining the mixture under pressure, releasing the pressure to obtain a foamed material, and heating the foamed material to a temperature of at least 80° C. to cause expansion of the foamed material and thereby obtain the said closed cell polymeric foam.

6. A method according to claim 1, wherein the curing is carried out using a free radical curing agent.

7. A method according to claim 4, wherein the uncured foamable mixture additionally contains a compound having at least two free ethyleneically unsaturated end groups and capable of taking part in the curing.

8. A method according to claim 1, wherein the blowing agent comprises an exothermic primary blowing agent.

9. A method according to claim 8, wherein the exothermic primary blowing agent is an azocarbonamide derivative.

10. A method according to claim 8, wherein the blowing agent additionally comprises an endothermic secondary blowing agent.

11. A method according to claim 10, wherein the exothermic secondary blowing agent is a hydrazide.

12. A method according to claim 8, wherein the blowing agent additionally comprises an endothermic secondary blowing agent.

13. A method according to claim 1, wherein the foamable mixture comprises additionally a compound capable of serving as a heat sink.

14. A method according to claim 13, wherein the compound capable of serving as a heat sink is magnesium carbonate.

* * * * *